United States Patent [19]
Garcia

[11] 3,874,966
[45] Apr. 1, 1975

[54] LAMINATED ARTICLE OF MANUFACTURE AND METHOD OF MAKING THE SAME

[75] Inventor: Leonardo M. Garcia, Salem, N.H.

[73] Assignee: Johns-Manville Corporation, Greenwood Village, Colo.

[22] Filed: Mar. 28, 1973

[21] Appl. No.: 345,611

[52] U.S. Cl. .................... 156/85, 117/35 R, 117/41, 156/219, 161/3.5, 161/6, 161/216, 161/413, 350/288

[51] Int. Cl. ............................................. B32b 31/26

[58] Field of Search ............ 156/85, 219; 117/35 R, 117/41; 350/288; 161/3.5, 6, 216, 413

[56] References Cited
UNITED STATES PATENTS

| | | | |
|---|---|---|---|
| 2,928,131 | 3/1960 | Mahler | 161/3.5 X |
| 3,383,676 | 5/1968 | Nagel | 350/167 X |
| 3,574,109 | 4/1971 | Yoshikawa | 156/85 X |
| 3,661,686 | 5/1972 | Armstrong | 156/3.5 X |

*Primary Examiner*—Edward G. Whitby
*Attorney, Agent, or Firm*—Robert M. Krone; Stephen C. Shear

[57] ABSTRACT

A laminated article of manufacture, especially suitable as a decorative surface covering, and a method of making the same are disclosed herein. This method contemplates laminating together a layer of paper back supported aluminum foil, a layer of transparent and heat shrinkable material and a top layer of at least partially transparent material which displays a given design. The layers are consolidated into a unitary structure under pressure and heat for a given period of time so as to cause irreversible shrinkage of the heat shrinkable material and the production of randomly located creases in the layer of metallic foil. The ultimately produced article sets forth a unique design and aesthetically pleasing appearance.

10 Claims, 3 Drawing Figures

LAMINATED ARTICLE OF MANUFACTURE AND METHOD OF MAKING THE SAME

BACKGROUND OF THE INVENTION

1. Field of the Invention

The present invention relates generally to laminated articles and more particularly to a unique high pressure decorative plastic laminate article of manufacture, which is especially useful as a decorative surface covering, and a novel method of making the same.

2. Description of Prior Art

The prior art has suggested many different types of decorative surface coverings as well as various different methods of making the same. However, in most cases these surface members or decorative applications are made by laminating together under pressure and heat a number of thin sheets of relatively inexpensive material so as to obtain bulk and strength along with a top sheet which displays the desired design.

More recently, the high pressure decorative plastic laminate industry has become more competitive causing the various manufacturers to research the possibility of producing decorative effects in conjunction with new and different designs. One such design is that which is three dimensional or which gives the appearance of being three dimensional. This has been accomplished, for example, by embossing the surface of the decorative sheet or by embedding some type of suitable particulate matter therein during the lamination process. Both of these methods do produce a three dimensional appearance, but, at the same time, have been found to be relatively expensive compared to the normal methods of making a conventional decorative laminated sheet. In addition, the use of embossed surface coverings generally and surface coverings including imbedded particulate materials of decorative value are not actually new and different.

BRIEF SUMMARY OF THE INVENTION

In accordance with the foregoing, an object of the present invention is to provide a laminated article of manufacture which displays a unique decorative design and which is aesthetically pleasing in appearance.

Another object of the present invention is to provide a laminated article of manufacture of the last mentioned type which is three dimensional in appearance and which is especially useful as a decorative surface covering.

Still another object of the present invention is to provide a unique and economical method of making the last mentioned article of manufacture.

The foregoing objects, as well as other objects and features, are achieved by the present invention which provides for a laminated article including a reinforced layer of creasable material, with a reflective surface, preferably a ductile and malleable metallic foil, and a layer of substantially transparent or at least partially transparent and heat shrinkable material such as, for exmaple, polyvinyl chloride. Both layers contain a plurality of randomely located creases preferably as a result of rheological characteristics of and dimensional changes in the heat shrinkable component indured by a heat and pressure operation. In addition, the laminated article may include a transparent or at least partially transparent top layer or film which is preferably a relatively hard birefringent material and which preferably includes a picture or design. This not only provides a protective top coating to the article, but also enhances the aesthetic appearance thereof.

In accordance with the present invention, the above described laminated article is preferably made by positioning the various layers in superimposed relationship with a bonding substance therebetween. Thereafter, the layers are bonded together so as to simultaneously produce a quilted surface effect resulting from a plurality of randomly located creases in the layer of metallic foil. This is preferably accomplished by compressing the positioned layers with a predetermined amount of pressure at a predetermined temperature and for a predetermined amount of time. In this manner, the various layers are not only bonded or laminated together in the form of resin reinforced stratified layers, but also the film of heat shrinkable material is caused to irreversibly shrink in such a way to produce the above-stated quilted appearance or creases on the metallic foil layer.

This method of the present invention has been found to be an economical and reliable way of manufacturing the above-described laminated article. One reason for this is that there is no complicated steps required in the process and all of the material used is relatively inexpensive. Another reason is that the various processing steps are not drastically different from those steps previously required to make standard high pressure decorative laminated surface coverings. Hence, much of the machinery and technology used in making the product can also be used in making the laminated article of the present invention.

DETAILED DESCRIPTION AND PREFERRED EMBODIMENTS

Figure 1:
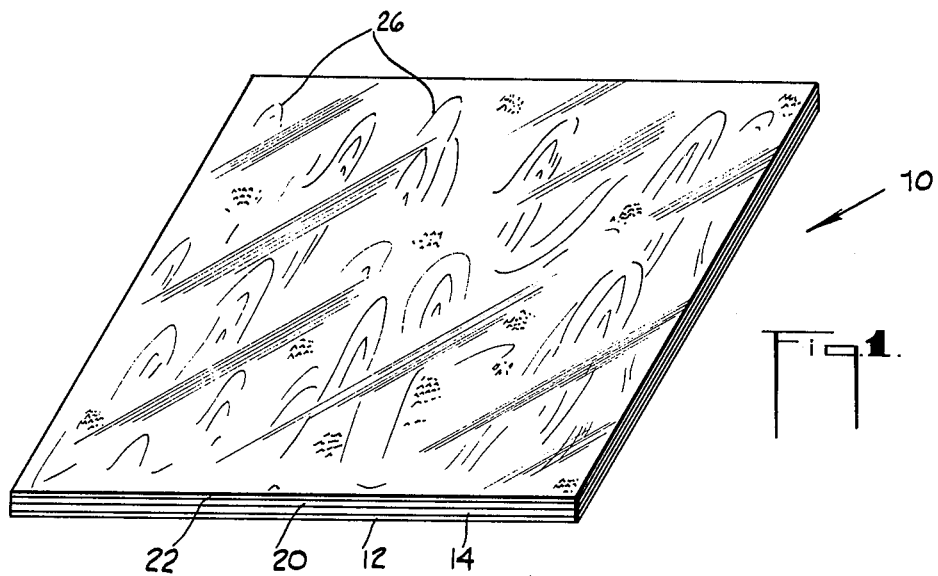
FIG. 1 is a perspective view of a laminated article of manufacture constructed in accordance with the present invention.

Turning now to the drawing, wherein like components are designated by like reference numerals throughout the three Figures, an article of manufacture constructed in accordance with the present invention is illustrated and generally designated by the reference numeral 10. The article, which is especially useful as a decorative surface covering is made up of a plurality of laminated or bonded layers. For purposes of clarity, the thickness of each of these layers is exaggerated in the drawing. In a preferred embodiment they are much thinner in cross section.

Figure 2:
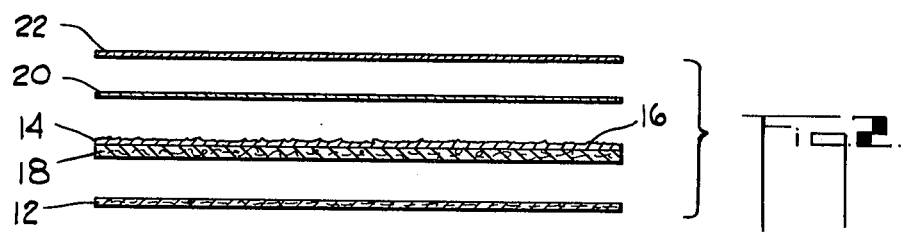
FIG. 2 is an exploded side elevational view illustrating the various layers making up the article of FIG. 1.

As illustrated in FIGS. 1 and 2, article 10 includes a bottom or lowermost layer 12 which, as will be seen hereinafter, acts as a support for imparting bulk and rigidity to the article. A second layer 14 is disposed directly on top of support layer 12 and comprises a thin, creasable and opaque material including a top side 16 which is highly reflective to light. This material is preferably a metallic foil possessing ductility and malleability properties which come into active play during the laminating process. In this regard, a backing 18 is bonded to the bottom side of layer 14 for reinforcing the latter. In addition, as will be seen with respect to FIG. 3, the layer 14 includes a multiplicity of randomly located creases which, in part, aid in creating a certain decorative effect to be described hereinafter. To produce these randomly located creases in accordance with the present invention, a layer of transparent and heat shrinkable material 20 is disposed directly on top of layer 14. As a top layer, article 10 includes a transparent or at least partially transparent material 22 which acts as a protective coating and also aids in imparting the desired decorative effect.

Turning now to a more detailed description of the various layers making up article 10, attention is firstly directed to lowermost layer 12. This layer is provided for supporting the remaining layers during the laminating process and also eventually becomes the core in the ultimate product, thereby imparting most of the strength and bulk to the latter. Most any sheet material may be utilized as layer 12 so long as it imparts the desired strength and thickness to the finished article. In an actual working embodiment, layer 12 is comprised of several sublayers of Kraft paper which are impregnated with phenolic resin. In this working embodiment there are approximately 8 sublayers which, together, provide a core which is approximately 60 mils thick. However, again, the exact number of sublayers which may be used will depend upon the ultimate strength and thickness of the final article, which, of course, depends upon the ultimate use of the article.

The second lowermost layer 14 making up article 10, as stated above, comprises a thin sheet of creasable and opaque material having at least its top side highly reflective to light. As also stated above, this material is preferably a ductile and malleable metallic foil such as, for example, readily available aluminum foil. The foil is bonded on its bottom side by suitable adhesive material (not shown) to a support or reinforcement backing 18 which is preferably an inexpensive paper sheet.

In order to improve the handleability of the metallic foil layer 14, the latter is preferably bonded to backing 18 prior to the lamination of the main layers making up article 10. In addition, metallic foil layer 14 is preferably between approximately 0.1 mil and 5.0 mils thick. Below approximately 0.1 mil, the foil tends to readily break apart and above approximately 5 mils it does not readily crease in the manner to be described below. In an actual working embodiment, the aluminum foil is approximately 0.5 mil thick.

Figure 3:
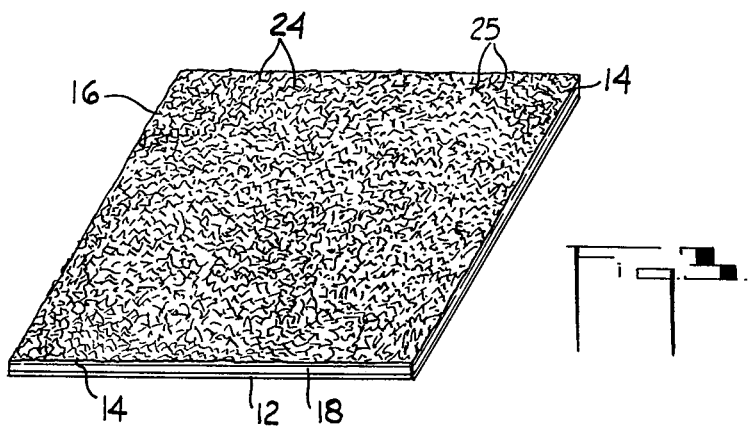
FIG. 3 is a perspective view illustrating a particular intermediate layer in the article of FIG. 1.

Turning to FIG. 3, there is illustrated a perspective view showing metallic foil layer 14 and particularly showing the top surface 16 thereof. As previously indicated, this metallic foil layer contains a plurality of randomly located creases which appear at least on the top surface. These creases which impart a quilted appearance to the surface, and which are generally designated by the reference numeral 24, actually define outwardly protruding ridges 25 which impart a textural roughness or irregularity to the top side 16 of metallic foil layer 14 for simulating a layer of randomly spaced and randomly angled reflectors. In general, these ridges are microscopic in size and to the naked eye appear merely to be randomly located indentations in the foil. They can, of course, be larger and more pronounced.

To further illustrate generally what the aforedescribed creases and ridges look like, one could simulate their appearance by taking an initially smooth sheet of aluminum foil or other such foil, crumble the sheet up and thereafter attempt to place it back in its initial smooth condition. Upon doing this, it will be noted that, in most cases, the sheet of foil contains randomly located creases and ridges which provide a crinkled look to the foil. Alternatively, one may take the thin smooth sheet of aluminum foil, lay the sheet down on the abrasive surface of a regular sandpaper and proceed to press the foil using a smooth rubber roller. Upon separation, the original textured surface of the sandpaper becomes physically impressed on the foil. It is to be understood that these last-mentioned creases and indentations are not to be construed as being identical to the creases 24 and ridges 25 in metallic foil layer 14 but rather as an illustration of approximate similarity. In fact, the creases, ridges and indentations in these illustrations will probably be much more pronounced than those preferably much smaller creases and ridges contained in layer 14. For the most part, this is because of the particular way in which creases 24 are formed in layer 14, as will be described hereinafter.

As stated directly above, metallic foil layer 14 includes a plurality of randomly located creases 24. To produce these creases in accordance with the present invention, laminated article 10 includes the previously set forth layer of transparent or at least partially transparent and heat shrinkable material 20 disposed directly above layer 14. More specifically, during the bonding or lamination of the various adhesive coated layers making up the article, as will be described below, layer 20 is caused to irreversably shrink under pressure and heat. This shrinkage, as will be seen, produces randomly located creases (not shown) which, it is believed, actually produce the aforedescribed creases 24.

Layer 20 may consist of any oriented thermoplastic and optically transparent film so long as it contains at least a microscopic degree of irreversible shrinking in response to applied heat. Examples of such materials are acrylics and its copolymers, polyesters, vinyls, polystyrene, and polyolefins. In an actual working embodiment, polyvinyl chloride is preferred, mainly because of its commercial availability. In this regard, again because of its commercial availability, the preferred thickness of heat shrinkable layer 20 is between 0.25 mil and 10.0 mils.

In addition to the previously described layers, laminated article 10 includes top layer 22 which, in accordance with a preferred embodiment of the present invention, has been selected to provide at least two functions. One such function is to provide a protective top coating for the ultimately produced article, especially where the latter is used in conventional decorative surface covering applications such as in furniture, counter tops, wall panelling systems, kitchen cabinets, etc. As a second preferred function, layer 22, in conjunction with metallic foil layer 14, aids in promoting a design which is unique and which is at least partially three dimensional in appearance.

In order to fulfill both of the above stated functions, layer 22 preferably comprises a biaxially oriented polyester film, i.e., polyethylene terepthalate, which is commercially available under the trademark "MYLAR," "CELANAR" or "MILINEX" etc., or a biaxially oriented polystyrene such as one commercially available under various tradenames. Both of these specific films have been found to be suitably resistant to physical abuse. In addition, both of these specific films are birefringent, that is, both are adapted to scatter light which impinges upon their surfaces in a certain manner. This, in turn, enhances the appearance of three dimensions. In this regard, the bottom side of layer 22 is preferably reverse printed with a particular design as generally designated by the reference numeral 26 using, for example, a conventional rotogravure printing press or other such process. There is, of course, no limitation on the particular design printed or otherwise provided on layer 22 so long as the layer is at least partially transparent, even through parts of the design, so that metallic foil layer 14 is at least partially visible therethrough. In this regard, a similar design could be provided on layer 20 making the latter only partially transparent or on a totally separate layer in addition to or in lieu of the design on this layer.

There is no particular limitation on the thickness of top layer or film 22 except that it should be thick enough to achieve the aforedescribed functions and yet not too thick so as to be economically unsuitable. Because of commercial availability, it is generally between approximately 0.25 mil and 10 mil in thickness.

In order to properly bond or laminate the aforedescribed layers comprising article 10, thin layers of adhesive material, for example between 0.1 and 0.3 dry mil in thickness, are provided between adjacent layers. Examples of such adhesive materials are acrylics, polyesters, epoxys, vinyls and polyurethanes. It should, of course, be apparent that those layers of adhesives disposed between the top layer 22 and the metallic foil layer 14 must be transparent so as not to obstruct the view of the metallic layer through the top layer and heat shrinkable layer 20. In addition, the layer of adhesive which bonds the heat shrinkable layer 20 to the malleable metallic foil layer should also be at least microscopically heat shrinkable in response to heat so that it does not interfere with the production of creases 24 during shrinkage of layer 20.

A preferred adhesive material and one which is provided in a working embodiment of the present invention is a polyester adhesive. This particular adhesive not only provides the required transparency and shrinkage, but it is also especially suitable where top layer 22 is a polyester or polystyrene film. The reason for this is that both types of film are very difficult to bond or laminate and a polyester adhesive has been found to satisfactorily bond to such material. The polyester adhesive is preferably of the cross linkable type and therefore provides excellent heat, moisture and chemical resistance.

From the foregoing, it should be readily apparent that laminated article 10 imparts a unique design when viewing the article from its top side. This is, of course, true whether or not the birefringent top layer is provided, since the aforedescribed randomly located creases and ridges act as tiny reflectors for providing a unique optical pattern. However, when the top birefringent layer is provided in conjunction with these tiny reflectors and a particular image is printed or otherwise provided on the top layer or other layer therebetween, an optical pattern is produced which imparts a three dimensional appearance or at least a partial three dimensional appearance of the particular image when light is reflected from the article.

In accordance with the present invention, laminated article 10 is preferably manufactured in an economical and reliable fashion, very similar to the way in which standard or typical surface covering sheet material is made, however, with certain exceptions to become apparent hereinafter. More specifically, the previously described layers making up article 10 are positioned in a stacked relationship in the order shown in FIGS. 1 and 2. In this regard, prior to or during this step, the aforedescribed layers of adhesive material are provided for bonding the layers together. This may be achieved in any conventional manner such as, for example, by utilizing a gravure coater, reversed roll coater, spray mechanism, or for that matter, a knife.

After the various layers are positioned in the foregoing manner and the required adhesive is applied, they are laminated together by compression and the application of heat. While this may be accomplished in any suitable manner, it is preferably carried out by the utilization of two confronting and spaced apart pressure plates which are heated to the required temperature. The stacked layers are transferred, by any suitable means, to a position between these plates where they can be simultaneously compressed and heated to form laminated article 10.

In accordance with the present invention, during the simultaneous application of pressure and heat, the heat shrinkable layer 20 of article 10 tends to shrink. However, because of the applied pressure to the various layers, layer 20 is not allowed to shrink uniformly, that is, in a uniformly dimensional fashion, which otherwise would be the case in the absence of any sufficient pressure. Rather, the heat shrinkable layer tends to shrink in a random fashion so as to contain randomly located creases which are at least microscopic in size. In addition, the adhesive substance bonding the heat shrinkable layer to the metallic foil layer 14 tends to shrink in response to the applied heat. Because of the pressure exerted against the various layers and particularly the malleable metallic foil layer 14 and heat shrinkable layer 20, it is believed that the production of creases in the latter simultaneously produces the aforedescribed creases 24 and ridges 25 on the surface 16 of metallic foil layer 14. In most cases the amount of shrinkage to layer 20 is quite small and hence produces microscopic creases in the metallic foil, as stated above. However, greater shrinkage may readily produce larger creases.

The exact amount of pressure and heat required in carrying out the aforedescribed process will, for the most part, depend upon the particular type of material, used as well as the thickness of the individual layers. In accordance with a working embodiment of the present invention, a pressure between approximately 800 psi and 1400 psi is provided at a temperature between approximately 260°F and 300°F for approximately 16 to 22 minutes. Below a pressure of approximately 800 psi it is difficult to obtain completely satisfactory bonding between the layers, especially where the aforedescribed preferred materials are used, and above approximately 1,400 psi the adhesive material between the various layers tend to squeeze out the sides thereof. With respect to heat, it has been found that below approximately 260°F, the adhesive layers do not completely cure. However, above approximately 300°F, the heat shrinkable layer tends to melt. Further, if the pressure and heat is not applied for at least approximately 16 minutes, the adhesive is not properly cured and if it is maintained in a compressed and heated condition for more than approximately 22 minutes, the ultimate product becomes too brittle. This example is, of course, only an illustration of a working embodiment and is not intended to limit the process of the present invention.

From the foregoing, it should be readily apparent that the present invention provides a laminated plastic article and particularly one which is useful as a decorative surface covering displaying a unique design. In this regard, it is to be understood that layers of material, other than those previously described, may be included as part of laminated article 10, so long as the overall design is not adversely affected.

What is claimed is:

1. A method of making a decorative laminated article of manufacture, comprising:
   a. positioning a plurality of layers of material in stacked relationship to one another with adhesive material between adjacent layers, said layers including
      i. an article support layer,
      ii. a layer of light-opaque, creasable material positioned over said article support layer, said material including a light-reflective surface facing away from said support layer,
      ii. a layer of at least partially transparent and heat-shrinkable plastic material disposed on the reflective surface of said light-opaque layer, and
      iv. a layer of at least partially transparent plastic material disposed on said heat-shrinkable layer; and
   b. compressing and substantially simultaneously heating said positioned layers so as to cause
      i. said layers to bond together,
      ii. said heat-shrinkable material to shrink, and
      iii. the production of a plurality of randomly located creases in said opaque layer.

2. A method according to claim 1 wherein the adhesive material between said layers of creasable material and heat-shrinkable material is a heat-shrinkable plastic adhesive, said shrinkable adhesive shrinking along with said heat shrinkable material due to said compressing and heating of said layers.

3. A method according to claim 1 wherein said compressing and heating step includes applying between approximately 800 psi and 1400 psi pressure to said positioned layers at a temperature of between approximately 260°F and 300°F.

4. A method according to claim 3 wherein said pressure is applied to said layers at said temperature for between approximately 16 minutes and 22 minutes.

5. A method according to claim 1 wherein said layer of transparent plastic material displays a visible predetermined design.

6. A method according to claim 5 wherein said last-mentioned layer is comprised of a birefringent material, whereby it is adapted to scatter light impinging thereon.

7. A method according to claim 1 wherein said layer of opaque material is a malleable and ductile metallic foil.

8. A method of making a laminated article of manufacture, comprising:
   a. positioning a plurality of layers of material in stacked relationship to one another with adhesive material between adjacent layers, said layers including
      i. a lowermost article support layer,
      ii. a layer of metallic foil bonded on one side of a support backing, said foil and backing being disposed on top of said article support layer with the backing located therebetween,
      iii. a layer of at least partially transparent and heat shrinkable plastic material disposed on said layer of foil, and
      iv. a layer of at least partially transparent plastic material disposed on said heat shrinkable layer; and
   b. compressing said positioned layers with a pressure of between approximately 800 psi and 1,400 psi at a temperature of between approximately 260°F and 300°F for between approximately 16 to 22 minutes, thereby causing
      i. said layers to bond together,
      ii. said heat shrinkable material to shrink, and
      iii. the production of a plurality of randomly located creases in said metallic foil.

9. A method according to claim 8 wherein said layer of at least partially transparent material is a birefringent plastic film displaying a predetermined design.

10. A method according to claim 8 wherein the adhesive material between said layers of metallic foil and heat shrinkable material is a heat shrinkable plastic adhesive.

* * * * *